US011166314B2

United States Patent
Baron et al.

(10) Patent No.: US 11,166,314 B2
(45) Date of Patent: Nov. 2, 2021

(54) RESTORED FAIRNESS IN AN 802.11 NETWORK IMPLEMENTING RESOURCE UNITS

(71) Applicant: CANON KABUSHIKI KAISHA, Tokyo (JP)

(72) Inventors: Stéphane Baron, Le Rheu (FR); Patrice Nezou, Liffre (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 16/316,706

(22) PCT Filed: Jul. 12, 2017

(86) PCT No.: PCT/EP2017/067627
§ 371 (c)(1),
(2) Date: Jan. 10, 2019

(87) PCT Pub. No.: WO2018/011310
PCT Pub. Date: Jan. 18, 2018

(65) Prior Publication Data
US 2019/0313453 A1   Oct. 10, 2019

(30) Foreign Application Priority Data

Jul. 13, 2016 (GB) ........................... 1612151

(51) Int. Cl.
*H04L 12/00* (2006.01)
*H04W 74/08* (2009.01)
(Continued)

(52) U.S. Cl.
CPC ..... *H04W 74/0816* (2013.01); *H04W 56/0005* (2013.01); *H04W 72/0413* (2013.01); *H04W 74/006* (2013.01)

(58) Field of Classification Search
None
See application file for complete search history.

(56) References Cited

U.S. PATENT DOCUMENTS

2012/0207036 A1\* 8/2012 Ong ............... H04W 74/0816
370/252
2016/0014804 A1   1/2016 Merlin et al.
(Continued)

FOREIGN PATENT DOCUMENTS

EP   3403457 A1   7/2017
EP   3456140 A1   11/2017
(Continued)

OTHER PUBLICATIONS

Yu Wang, et al. Backoff Procedure Handling Upon TF Reception, May 11, 2016, IEEE, Doc. No. IEEE J02.11-16/0583r1 (Year: 2016).*

(Continued)

*Primary Examiner* — Ajit Patel
*Assistant Examiner* — Lionel Preval
(74) *Attorney, Agent, or Firm* — Canon U.S.A., Inc. IP Division

(57) ABSTRACT

802.11ax nodes benefit from additional medium accesses through multi-user uplink provided by an AP, compared to legacy node. To restore fairness in medium access, the invention proposes to update node's EDCA parameters, in particular EDCA backoffs, using penalty values each time the node successfully transmits data to the AP over OFDMA resource units. This is to reduce the probability for the node to access anew a communication channel through conventional EDCA contention. The penalty value is preferably provided by the AP which has an overview of the system and may be adjusted based on information local to the node, for instance the amount of data transmitted or its current contention window. For instance, the penalty value is added to (Continued)

the current value of the EDCA backoff counters upon successful OFDMA transmission by the node.

19 Claims, 8 Drawing Sheets

(51) Int. Cl.
*H04W 56/00* (2009.01)
*H04W 72/04* (2009.01)
*H04W 74/00* (2009.01)

(56) References Cited

U.S. PATENT DOCUMENTS

| | | | |
|---|---|---|---|
| 2016/0127233 A1 | 5/2016 | Wentink et al. | |
| 2016/0198500 A1 | 7/2016 | Merlin et al. | |
| 2017/0202017 A1* | 7/2017 | Zhou | H04B 7/0452 |
| 2017/0347372 A1* | 11/2017 | Li | H04W 28/0278 |
| 2018/0254993 A1* | 9/2018 | Ahn | H04L 1/18 |
| 2018/0352572 A1* | 12/2018 | Cariou | H04W 74/085 |

FOREIGN PATENT DOCUMENTS

| | | |
|---|---|---|
| EP | 3393145 A1 | 10/2018 |
| EP | 3412107 A1 | 12/2018 |
| EP | 3485692 A1 | 5/2019 |
| JP | 2001274810 A | 10/2001 |
| JP | 2007053524 A | 3/2007 |
| KR | 10-2012-0087173 A | 8/2012 |
| KR | 10-2012-0135247 A | 12/2012 |
| KR | 10-2016-0082524 A | 7/2016 |
| WO | 2015/066175 A1 | 5/2015 |

OTHER PUBLICATIONS

Yu Wang, et al., Backoff Procedure Handling Upon TF Reception, May 11, 2016, 11 pages, IEEE, Doc. No. IEEE 802.11-16/583r1, URL:https://mentor.ieee.org/802.11/dcn/15/11-15-1137-01-00ax-triggered-ofdma-random-access-observations.pptx.

Russell Huang, et al., Triggered OFDMA Random Access Observations, Sep. 11, 2015, 14 pages, IEEE, Doc. No. IEEE 802.11-15/1137, URL:https://mentor.ieee.org/802.11/dcn/15/11-15-1137-01-00ax-triggered-ofdma-random-access-observations.pptx.

Evgeny Khorov, et al., "Channel Access Efficiency, Date: May 18, 2016", doc.: IEEE 802.11-16/684r2, May 18, 2016 (May 18, 2016), XP055416306, Retrieved from the Internet: URL: https://mentor.ieee.org/802.11/dcn/16/11-16-0684-02-00ax-channel-access-efficiency.pptx.

Woojin Ahn, et al., "Congestion control for UL MU random access, Date: Jan. 19, 2016", doc.: IEEE 802.11-16/00SSr1 EEE-SA Mentor, Piscataway, NJ USA, Jan. 20, 2016 (Jan. 20, 2016), pp. 1-15, XP068104863, Retrieved rom the Internet: URL: https://mentor.ieee.org/802.11/dcn/16/11-16-0085-01-00ax-congestion-control-for-ul-mu-random-access.pptx.

Dmitriy Kuptsov, et al., "Flow penalty leads to improvement: A measurement study of wireless backoff", in IEEE 802.11 networks, Computer Networks, Dec. 1, 2014 (Dec. 1, 2014), pp. 37-57, XP055416357, Amsterdam DOI: 10.10161-J.comnet.2014.09.008, Retrieved from the Internet: URL: https://aaltodoc.aalto.fi/bitstream/handle/123456789/12781/A1_kuptsov_dmitriy_2014.pdf?sequence=1.

* cited by examiner

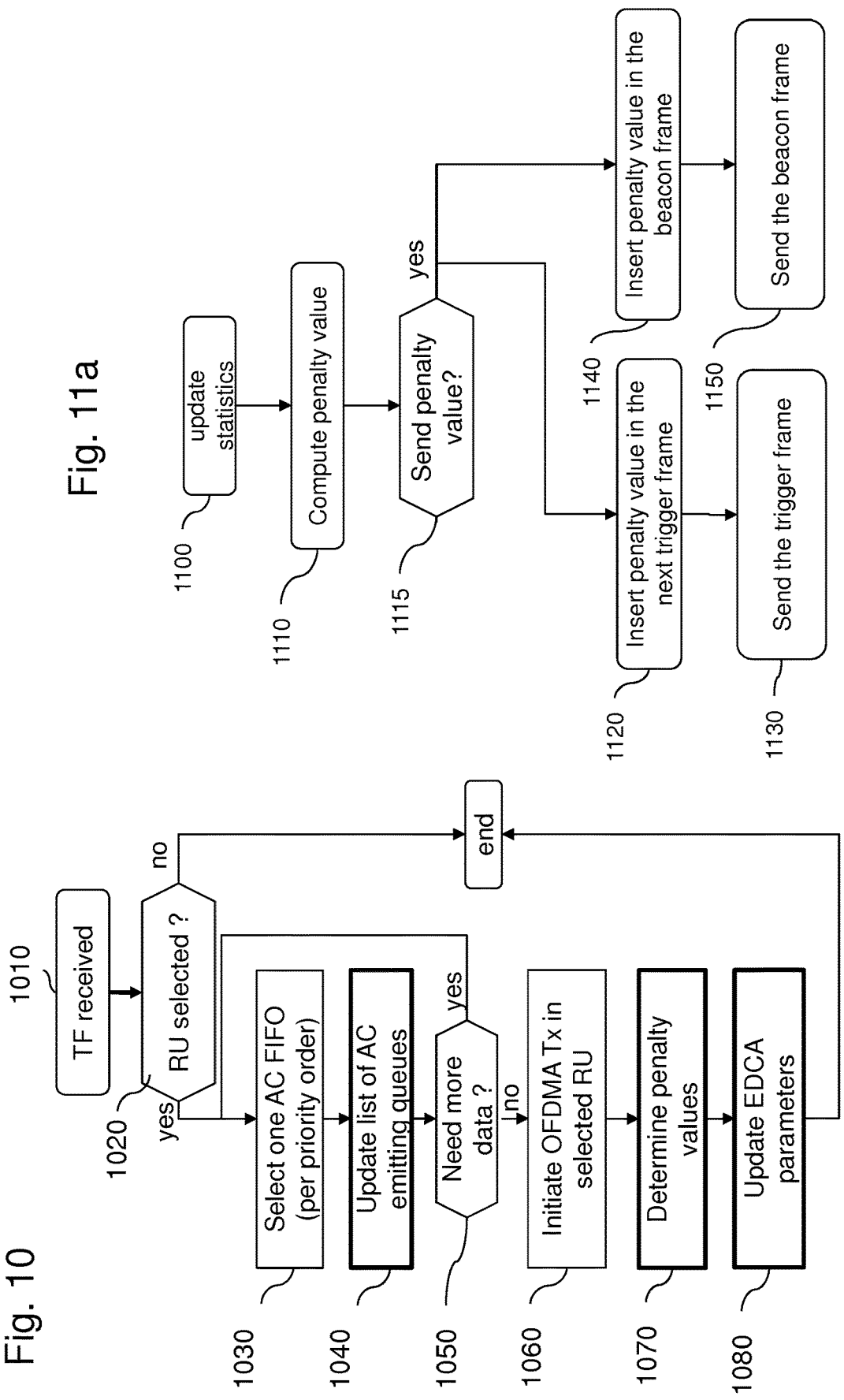

RESTORED FAIRNESS IN AN 802.11 NETWORK IMPLEMENTING RESOURCE UNITS

CROSS-REFERENCE TO RELATED APPLICATIONS

This application is the National Phase application of PCT Application No. PCT/EP2017/067627, filed on Jul. 12, 2017, which claims the benefit under 35 U.S.C. § 119(a)-(d) of United Kingdom Patent Application No. 1612151.9, filed on Jul. 13, 2016, which applications are hereby incorporated by reference herein in their entireties.

FIELD OF THE INVENTION

The present invention relates generally to communication networks and more specifically to communication networks offering channel accesses to nodes through contention and providing secondary accesses to the nodes to sub-channels (or Resource Units) splitting a transmission opportunity TXOP granted to an access point, in order to transmit data.

The invention finds application in wireless communication networks, in particular in 802.11ax networks offering, to the nodes, an access to an 802.11ax composite channel and/or to OFDMA Resource Units forming for instance an 802.11ax composite channel granted to the access point and allowing Uplink communication to be performed.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more communication channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each.

EDCA (Enhanced Distributed Channel Access) defines traffic categories and four corresponding access categories that make it possible to handle differently high-priority traffic compared to low-priority traffic.

Implementation of EDCA in the nodes can be made using a plurality of traffic queues for serving data traffic at different priorities, to which a respective plurality of queue backoff engines is associated. The queue backoff engines are configured to use queue contention parameters, including respective queue backoff values, to contend for access to a composite channel, in order to transmit data stored in the associated traffic queues.

Thanks to the EDCA backoff procedure, the node can thus access the communication network using contention type access mechanism based on the queue backoff parameters, typically based on a computed queue backoff counter or value.

The primary channel is used by the communication nodes to sense whether or not the channel is idle, and the primary channel can be extended using the secondary channel or channels to form a composite channel. The primary channel can also be used alone.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the nodes compliant with a use of composite channels (i.e. 802.11n and 802.11ac-compliant nodes or "HT nodes" standing for High Throughput nodes) have to co-exist with legacy nodes not able to use composite channels but relying only on conventional 20 MHz channels (i.e. non-HT nodes compliant only with for instance 802.11a/b/g) exist within the same wireless network, and thus have to share the same 20 MHz channels.

To cope with this issue, the 802.11n and 802.11ac and 802.11ax standards provide the possibility to duplicate control frames (e.g. RTS/CTS or CTS-to-Self or ACK frames to acknowledge correct or erroneous reception of the sent data) over each 20 MHz channel in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11n/ac/ax node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non- HT" transmission of a given control frame over secondary 20 MHz channel(s) of the (40 MHz, 80 MHz or 160 MHz) operating band.

In practice, to request a composite channel (equal to or greater than 40 MHz) for a new TXOP, an 802.11n/ac node performs an EDCA backoff procedure in the primary 20 MHz channel as mentioned above. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before any queue backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user (MU) transmission has been considered to allow multiple simultaneous transmissions to/from different users in both downlink (DL) and uplink (UL) directions during a transmission opportunity granted to the AP. In the uplink, multi-user transmissions can be used to mitigate the collision probability by allowing multiple nodes to simultaneously transmit.

To actually perform such multi-user transmission, it has been proposed to split a granted channel into sub-channels, also referred to as resource units (RUs), that are shared in the frequency domain by multiple users, based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different nodes in order to increase concurrency. Adjacent sub-carriers often experience similar channel conditions and are thus grouped to sub-channels: an OFDMA sub-channel or RU is thus a set of sub-carriers.

As currently envisaged, the granularity of such OFDMA sub-channels is finer than the original 20 MHz channel band. Typically, a 2 MHz or 5 MHz sub-channel may be contemplated as a minimal width, therefore defining for instance 9 sub-channels or resource units within a single 20 MHz channel.

The multi-user feature of OFDMA allows the AP to assign different RUs to different nodes in order to increase competition. This may help to reduce contention and collisions inside 802.11 networks.

Contrary to downlink OFDMA wherein the AP can directly send multiple data to multiple stations (supported by specific indications inside the PLCP header), a trigger mechanism has been adopted for the AP to trigger uplink communications from various nodes.

To support multi-user uplink, i.e. uplink transmission to the 802.11ax access point (AP) during a pre-empted TXOP, the 802.11ax AP has to provide signalling information for the legacy nodes (non-802.11ax nodes) to set their NAV and for the 802.11ax nodes to determine the allocation of the resource units RUs provided by the AP.

It has been proposed for the AP to send a trigger frame (TF) to the 802.11ax nodes to trigger uplink communications.

The document IEEE 802.11-15/0365 proposes that a 'Trigger' frame (TF) is sent by the AP to solicit the transmission of uplink (UL) Multi-User (OFDMA) PPDU from multiple nodes. The TF defines the resource units as provided by the AP to the nodes. In response, the nodes transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel, if appropriate. As described above for the duplication of control frames, it is expected that every nearby legacy node (non-HT or 802.11ac nodes) receiving the TF on its primary channel, then sets its NAV to the value specified in the TF frame in order. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

In order to better improve the efficiency of the system with regards to un-managed traffic to the AP (for example, uplink management frames from associated nodes, unassociated nodes intending to reach an AP, or simply unmanaged data traffic), resource units may be proposed by the AP to the 802.11ax nodes through contention-based access. In other words, the resource unit RU can be randomly accessed by more than one node (of the group of nodes registered with the AP). Such RU is called Random RU and is indicated as such in the TF. Random RUs may serve as a basis for contention between nodes willing to access the communication medium for sending data.

An exemplary random resource selection procedure is defined in document IEEE 802.11-15/1105. According to this procedure, each 802.11ax node maintains a dedicated backoff engine, referred below to as OFDMA or RU (for resource unit) backoff engine, using RU contention parameters, including an RU backoff value, to contend for access to one of the random RUs. Once its OFDMA or RU backoff value reaches zero (it is for instance decremented at each new TF-R frame by the number of random RUs defined therein), a node becomes eligible for RU access and thus randomly selects one RU from among all the random RUs defined in the received trigger frame. It then uses the selected RU to transmit data of at least one of the traffic queues.

As readily apparent from the above, the Multi User Uplink medium access scheme (or OFDMA or RU access scheme) allows the number of collisions generated by simultaneous medium access attempts to be reduced, while also reducing the overhead due to the medium access since the medium access cost is shared between several nodes. The OFDMA or RU access scheme thus appears to be quite more efficient (with regards of the medium usage) than the conventional EDCA contention-based medium access scheme (in the context of a high density 802.11 cell).

Although the OFDMA or RU access scheme seems more efficient, the EDCA access scheme must also survive and thus coexist with the OFDMA or RU access scheme.

This is for instance due to the existence of legacy 802.11 nodes that are not aware of the OFDMA or RU access scheme.

This is also all the more necessary that the 802.11ax nodes should also have the opportunity to gain access to the medium through conventional EDCA contention-based medium access, for instance to send data to another node (i.e. for traffic different from uplink traffic to the AP). So the two medium access schemes, EDCA and OFDMA/RU access schemes, have to coexist.

This coexistence has downsides.

For instance, 802.11ax nodes and legacy nodes have the same medium access probability using the EDCA access scheme. However, the 802.11ax nodes have additional medium access opportunities using the MU Uplink or OFDMA or RU access scheme.

It results that access to the medium is not fully fair between the 802.11ax nodes and the legacy nodes.

SUMMARY OF INVENTION

It is a broad objective of the present invention to provide improved and fairer communication methods and devices in a communication network. The communication network includes a plurality of nodes and an Access Point with which some nodes (e.g. 802.11ax nodes) have registered, all of the nodes (including 802.11ax and legacy nodes) sharing the physical medium of the communication network.

The present invention has been devised to overcome one or more foregoing limitations, in particular to provide communication methods that offer fair access to both legacy nodes (which do not implement the second access scheme) and enhanced nodes (e.g. 802.11ax nodes, which implement the second access scheme).

The present invention may also optionally promote use of the second and more efficient access scheme (MU Uplink or OFDMA or RU access scheme in 802.11ax) to improve efficiency of the 802.11 cell while maintaining a good level of fairness with regards of the legacy nodes. This may result in having more efficient usage of the network bandwidth (of the RUs) with limited risks of collisions.

The invention can be applied to any communication network, e.g. a wireless network, in which resource units, either random RUs or scheduled RUs or both, are provided for MU Uplink to the AP, within a granted transmission opportunity. The RUs are sub-channels of one or more communication channels. The communication channel is the elementary channel on which the nodes perform sensing to determine whether it is idle or busy.

The invention is especially suitable for data uplink transmission from nodes to the AP of an IEEE 802.11ax network (and future version), in which case the RUs are accessed using OFDMA. Embodiments of the invention may also apply between nodes (without AP), as well as in any communication network other than 802.11ax provided that it offers two competing access schemes (one to a communication channel, the other to RUs or the like that can be accessed simultaneously).

In this context, embodiments of the invention provide a communication method in a communication network comprising a plurality of nodes, at least one node comprising a channel access module configured to contend for access to at least one communication channel of the communication network using channel contention parameters, in order to transmit data (for instance stored locally over an accessed communication channel); and the method comprising, at the node:

transmitting data (stored locally) over an accessed resource unit provided (i.e. defined) by another node within a transmission opportunity granted to the other node on the communication channel. Thus a resource unit form part of such a transmission opportunity granted to the other node; and in response to transmitting data over the accessed resource unit, modifying or updating a current value of at least one channel contention parameter into a (penalized) value, to reduce a probability for the node to access a communication channel through contention by the channel access module.

The present invention thus restores fairness in the communication network. This is achieved through penalizing the conventional channel access scheme (to reduce a probability to access the communication channel using this scheme) for those nodes that efficiently use Multi User Uplink through accessed RUs. Indeed, the legacy nodes are thus offered more opportunities to access the communication channels, relatively to the nodes also implementing the RU access scheme.

The present invention also promotes the use of the resource units for the nodes implementing Multi User Uplink, rather than the conventional EDCA access scheme, thus resulting in better network efficiency. This is because the penalty applied to the conventional channel access scheme increases the use of resource units, thereby increasing the sharing of medium access costs between the nodes.

Correspondingly, embodiments of the invention provide a communication device forming node in a communication network comprising a plurality of nodes, the communication device forming node comprising:

a channel access module configured to contend for access to at least one communication channel of the communication network using channel contention parameters, in order to transmit data stored locally over an accessed communication channel; and a communication module configured to transmit data stored locally over an accessed resource unit provided by another node within a transmission opportunity granted to the other node on the communication channel, and a controller configured to modify, in response to transmitting data over the accessed resource unit by the data transmission module, a current value of at least one channel contention parameter of the channel access module into a penalized value, to reduce a probability for the node to access a communication channel through contention by the channel access module.

The device offers the same advantages as the method described above.

Embodiments of the invention from an access point's perspective provide a communication method in a communication network comprising an access point and a plurality of nodes registered to the access point, at least one node comprising a channel access module configured to contend for access to at least one communication channel of the communication network using channel contention parameters, in order to transmit data stored locally over an accessed communication channel; and the method comprising, at the access point:

receiving data from one or more nodes over any of communication channels accessed by the one or more nodes, and resource units accessed by the one or more nodes, each resource unit being provided by the access point to the one or more nodes within a transmission opportunity granted to the access point on the communication channel;

determining a penalty value from a history of the received data; and sending, to the at least one node, the determined penalty value to drive the node in modifying a current value of at least one channel contention parameter into a penalized value based on the sent penalty value upon the node transmitting data over an accessed resource unit, to reduce a probability for the node to access the communication channel through contention by its channel access module.

By acting on the penalty value used by the nodes to adjust their channel contention parameters, the access point can thus efficiently drive the nodes in a fairer use of the communication network. In addition, an appropriate value for the penalty value may help promoting an efficient use of the RU access scheme, relatively to a use of the conventional channel access scheme.

Correspondingly, embodiments of the invention provide a communication device forming access point in a communication network comprising an access point and a plurality of nodes, at least one node comprising a channel access module configured to contend for access to at least one communication channel of the communication network using channel contention parameters, in order to transmit data stored locally over an accessed communication channel; and the communication device forming access point comprising:

a communication module configured to receive data from one or more nodes over any of communication channels accessed by the one or more nodes, and resource units accessed by the one or more nodes, each resource unit being provided by the access point to the one or more nodes within a transmission opportunity granted to the access point on the communication channel;

a penalty determining module configured to determine a penalty value from a history of the received data;

wherein the communication module is further configured to send, to the at least one node, the determined penalty value to drive the node in modifying a current value of at least one channel contention parameter into a penalized value based on the sent penalty value upon the node transmitting data over an accessed resource unit, to reduce a probability for the node to access the communication channel through contention by its channel access module.

The device forming access point provides the same advantages as the method described above.

Optional features of embodiments of the invention are defined in the appended claims. Some of these features are explained here below with reference to a method, while they can be transposed into system features dedicated to any device according to embodiments of the invention.

For instance, the channel access module may include one or more queue backoff engines and associated traffic queues for serving data traffic at different priorities, each queue backoff engine using queue contention parameters, including a respective queue backoff value, to contend for access to at least one communication channel in order to transmit data stored in the associated traffic queue over an accessed communication channel. They may be the conventional EDCA traffic queues, and the corresponding engine driving contention on the medium. In that case, the channel contention parameters are those queue contention parameters.

Also, the node may include an RU access module separate from the channel access module and configured to manage access to at least one resource unit provided by the other node within a transmission opportunity granted to the other node on the communication channel, in order to transmit data stored locally over an accessed resource unit.

In practice, the RU access module may handle both scheduled RUs and random RUs provided in the trigger frames. Scheduled RUs are detected by merely reading the content of any received trigger frame. As far as the random RUs are concerned, the RU access module may include an RU backoff engine separate from the queue backoff engines (or more generally from the channel access module), using RU contention parameters, including an RU backoff value, to contend for access to at least one random resource unit provided by the other node within a transmission opportunity granted to the other node on the communication channel, in order to transmit data stored in either traffic queue over an accessed random resource unit. The RU backoff value is usually decremented at each newly received trigger frame, by the number of random RUs declared in the received TF. Contention to the random RUs is thus efficiently achieved.

In embodiments, the current value and the penalized value are non-zero values. In practice, the penalized value is made greater than the current value, in order to statistically delay the following accesses to the medium by the penalized node.

In other embodiments, the method further comprises, at the node, receiving a trigger frame from the other node (usually the access point) in the communication network, the trigger frame reserving the transmission opportunity granted to the other node on the communication channel and defining resource units, RUs, forming the communication channel including the accessed resource unit, wherein the received trigger frame includes a penalty value to be applied to the current value to obtain the penalized value of the queue contention parameter.

This configuration makes it possible for the other node, usually the AP, to efficiently drive the nodes in a fairer use of the communication network and to promote use of more efficient RU access scheme (due to access cost sharing).

In yet other embodiments, the method further comprises, at the node, periodically receiving a beacon frame from an access point, each beacon frame broadcasting network information about the communication network to the plurality of nodes, wherein a received beacon frame includes a (by-default) penalty value to be applied to the current value to obtain the penalized value of the queue contention parameter.

This makes it possible for the access point, that usually has an overview of the overall network, to periodically set an efficient initial penalty value for the nodes.

In particular embodiments, the method further comprises, at the node, using the penalty value included in the trigger frame to modify the penalty value included in the beacon frame, in order to obtain a final penalty value to be applied to the current value to obtain the penalized value of the queue contention parameter. This illustrates how the penalty value to be applied can evolve over time, given indications provided by another node, preferably the access point. One may note that the penalty value may be easily reset at each new beacon frame. Of course, other periodicity for resetting can be used.

In other particular embodiments, the received beacon frame or the received trigger frame includes a plurality of penalty values associated with respective data types, and the method further comprises, at the node, selecting a penalty value from the plurality based on a data type associated with a traffic queue corresponding to a channel contention parameter to modify. Indeed, some specific queue contention parameters may be associated with (e.g. EDCA) traffic queues having different priorities. Thus, this embodiment makes it possible to adjust the penalty to each different data type.

In other embodiments, modifying the current value of the channel contention parameter into the penalized value depends on the amount of data transmitted in the accessed resource unit. One may understand that various nodes sending various amounts of data will be penalized with different magnitudes.

This configuration thus advantageously avoids strongly penalizing a node when it only sends a reduced quantity of data via the OFDMA/RU access scheme.

In yet other embodiments, the modified channel contention parameter includes a queue backoff value, the queue backoff value being decreased by the node over time to access the communication channel upon reaching zero (usually to send data store in a corresponding traffic queue). This configuration makes it possible to immediately penalize the node.

For instance, modifying the queue backoff value includes adding a penalty value to the queue backoff value. It means that the node will wait longer (by the amount of added penalty value) before accessing the communication channel due to the countdown of the queue backoff value.

According to a specific feature, the added penalty value is a function of a size of a contention window from which the queue backoff value has initially been selected. This provision makes it possible to have a similar impact, due to the penalty, to each traffic queue that may be modified given the respective current probability. Indeed, the higher the contention window size, the higher the queue backoff value on overall. Thus, to be fair, the impact on the traffic queues is preferably made proportional to the contention window.

More precisely, the added penalty value may be a function of a ratio between the contention window size (noted CW) and a lower boundary $CW_{min}$ of a selection range from which a size of the contention window sizes is selected. This provision advantageously takes into account an estimate of the network load to impact the channel contention parameters. Indeed, the above-ratio substantially mirrors a number of consecutive collisions during the previous accesses by the nodes (because CW is usually doubled at each collision, starting from $CW_{min}$), and thus a kind of network load.

In some embodiments, the modified channel contention parameter includes a size of a contention window from which a queue backoff value is initially selected, the queue backoff value being decreased by the node over time to access the communication channel upon reaching zero. This configuration penalizes the nodes for future, since only the new selected queue backoff value will be impacted by the penalty-based modification.

In specific embodiments, the modified channel contention parameter includes a lower boundary $CW_{min}$ and/or a higher boundary $CW_{max}$, both defining a selection range from which a size of the contention window is selected. This also contributes to penalize the nodes for future.

In other specific embodiments, modifying the contention window size or the lower boundary or the higher boundary includes multiplying it with a penalty value.

In some embodiments of the invention, the accessed resource unit over which the data are transmitted is a random resource unit, the access of which being made through contention using separate RU contention parameters (separate from the channel contention parameters).

In other embodiments, the accessed resource unit over which the data are transmitted is a scheduled resource unit, the scheduled resource being assigned by the access point to the node.

Of course, some nodes may access scheduled RUs while other nodes may simultaneously access random RUs. The penalization according to the invention may thus occur simultaneously on various nodes than access different types of RUs.

In some embodiments, the other node is an access point of the communication network to which nodes register. This provision advantageously takes advantage of the central position of the access point. Indeed, the access point has an overview of the overall network, and thus can efficiently drive the nodes for the penalization process.

In some embodiments, modifying the current value into a penalized value is in response to successfully transmitting data over the accessed resource unit. Thus, the node is penalized for further conventional EDCA access only in case of successful transmission over RUs.

This provision thus tends to favor a medium access scheme that works for the node considered (as the transmission is successful). Consequently, the overall efficiency of the network is improved.

In specific embodiments, the channel access module includes traffic queues for serving data traffic at different priorities, and the method further comprises selecting at least one of the traffic queues from which the data to be transmitted are selected. Such a selecting step is required because the OFDMA access to resource units is not linked to a specific traffic queue.

According to a particular feature, selecting one traffic queue includes one of:

selecting a traffic queue having the lowest associated queue backoff value;

selecting randomly one non-empty traffic queue from the traffic queues;

selecting a traffic queue storing the biggest amount of data (i.e. the most loaded);

selecting a non-empty traffic queue having the highest associated traffic priority;

selecting a non-empty traffic queue associated with a data type matching a data type associated with the resource unit over which the data to select are to be transmitted.

According to another particular feature, the node (through the above-mentioned RU access module for instance) includes an RU backoff value to contend for access to at least one random resource unit provided by the other node within a transmission opportunity granted to the other node on the communication channel, and the method may further comprise, at the node upon receiving a trigger frame, decrementing the RU backoff value based on the number of random resource units defined in the received trigger frame.

Also, the method may further comprise, at the node, decrementing the queue backoff values (if any in the channel access module) each elementary time unit the communication channel is detected as idle.

In other embodiments, the method further comprises, at the node, clearing a queue backoff value corresponding to a traffic queue when no more data to be transmitted to the access point remain in the traffic queue after the step of transmitting data, the queue backoff value associated with a non-empty traffic queue being decreased by the node over time to access the communication channel upon reaching zero. Of course, this operation may be made for each traffic queue that becomes empty after the step of transmitting data.

Regarding the operations at the access point to drive the nodes, embodiments provide that determining the penalty value includes updating a current penalty value based on a ratio of bandwidth usage of resource units accessed by the nodes to transmit data to the access point, relatively to a total bandwidth usage of communication channels and resource units accessed by the nodes to transmit data to the access point. The bandwidth usage may be seen as the amount of data sent by the nodes, and thus conveyed over the accessed resource units and possibly the accessed communication channels. In other words, the access point takes into account whether or not a high proportion of the received data is conveyed using resource units to adjust the penalty value to be applied by the nodes.

It makes it possible for the AP to finely tune the penalty value to be applied by the nodes in order to favor one or the other of the conventional EDCA access scheme and the OFDMA/RU access scheme. This is because the above ratio substantially mirrors the efficiency of the penalty. Thus, based on it, the AP can decide whether or not the penalty is currently sufficient given other criteria (e.g. a density of nodes in the cell) and can accordingly adjust the penalty value to be sent.

In embodiments, the current penalty value is increased each time an evaluation of the ratio is less than a predefined target threshold. This is to penalize the nodes in using the conventional channel (EDCA) access scheme, thereby promoting use of MU Uplink through resource units.

In specific embodiments, the current penalty value is decreased each time an evaluation of the ratio is higher than a predefined target threshold. This is to reversely reduce promotion of MU Uplink through RUs, in order to reduce risk of having collisions therein.

In some embodiments, deciding to send the penalty value to the at least one node depends on a ratio between a number of accessed resource units that experience collisions, and a total number of resource units accessed by the nodes to transmit data to the access point. Again, the access point can thus promote use of MU Uplink up to a situation where risks of collisions are too high.

In yet other embodiments, the penalty value is transmitted in a trigger frame reserving a transmission opportunity to the access point on the communication channel and defining resource units, RUs, forming the communication channel, or is transmitted in a beacon frame broadcasting network information about the communication network to the plurality of nodes.

In yet other embodiments, the access point determines a penalty value for each type of data, from a history of received data having the same data type; and sends, to the at least one node, a plurality of penalty values associated with respective data types.

Another aspect of the invention relates to a communication system having a plurality of nodes, at least one of which being a communication device forming node as defined above.

In particular, the communication system may further include a communication device forming access point as defined above.

Another aspect of the invention relates to a non-transitory computer-readable medium storing a program which, when executed by a microprocessor or computer system in a communication device of a communication network, causes the communication device to perform any method as defined above.

The non-transitory computer-readable medium may have features and advantages that are analogous to those set out above and below in relation to the methods and devices.

Another aspect of the invention relates to a communication method in a communication network comprising a plurality of nodes, substantially as herein described with reference to, and as shown in, FIG. 10, or FIG. 11a, or FIGS. 10 and 11a of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 10 illustrates, using a flowchart, steps of accessing resource units based on an RU or OFDMA access scheme upon receiving a trigger frame defining RUs according to embodiments of the invention;

FIG. 11a illustrates, using a flowchart, general steps for the access point to compute and send one or more penalty values according to embodiments of the invention.

DETAILED DESCRIPTION

The invention will now be described by means of specific non-limiting exemplary embodiments and by reference to the figures.

Figure 1:
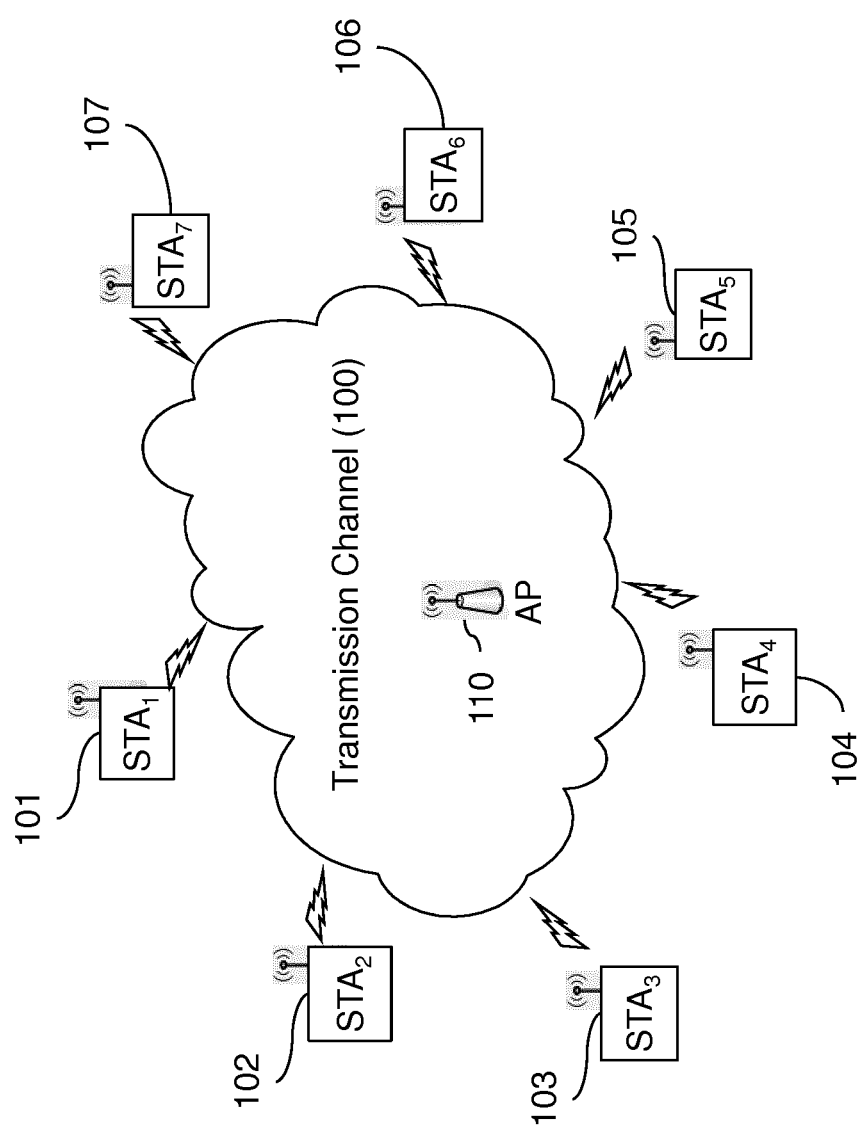
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110 with which the nodes have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in the contention window [0, CW], CW (integer) being also referred to as the Contention Window and defining the upper boundary (or contention window size) of the backoff selection interval. This backoff mechanism or procedure, also referred to as channel access scheme, is the basis of the collision avoidance mechanism that defers the transmission time for a random interval, thus reducing the probability of collisions on the shared channel. After the backoff time period (i.e. the backoff counter reaches zero), the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard, thus protecting data transmissions from any further collisions. The four-way CTS/RTS handshaking mechanism is well known, and thus not further described here. Reference is made to the standard for further details The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS (DCF inter-frame space) or when their own backoff counter has reached zero nearly at the same time. If both source nodes use the RTS/CTS mechanism, this collision can only occur for the RTS frames. Fortunately, such collision is early detected by the source nodes since it is quickly determined that no CTS response has been received.

Figures 2A, 2B:
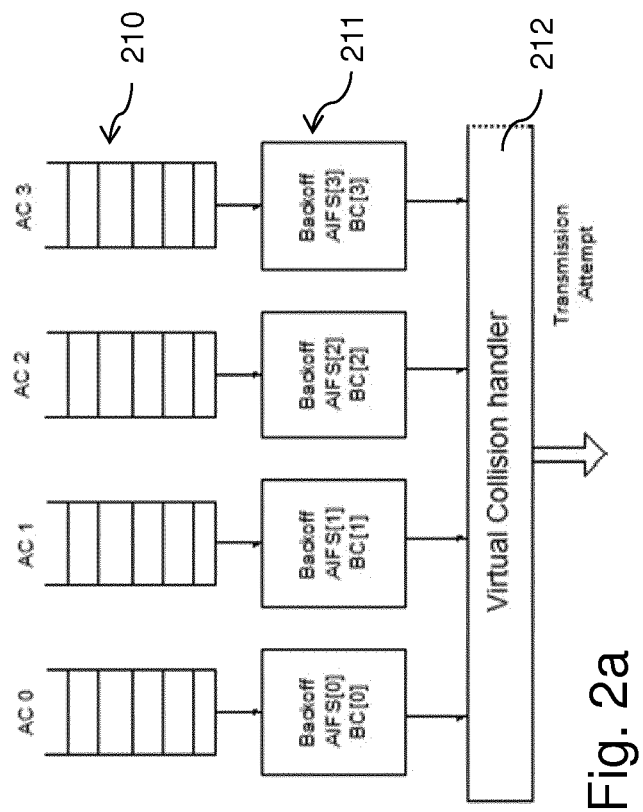
FIGS. 2a and 2b illustrate the IEEE 802.11e EDCA involving access categories.

FIGS. 2a and 2b illustrate the IEEE 802.11e EDCA involving access categories, in order to improve the quality of service (QoS). In the original DCF standard, a communication node includes only one transmission queue/buffer. However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access scheme or mechanism in WLANs because it features a distributed and easily deployed mechanism. The scheme contends for access to at least one communication channel of the communication network using channel contention parameters, in order for the node to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (310). Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of channel contention parameters or "queue backoff parameters", and is associated with a priority value, thus defining traffic of higher or lower priority of MSDUs. Thus, there is a plurality of traffic queues for serving data traffic at different priorities.

That means that each AC (and corresponding buffer) acts as an independent DCF contending entity including its respective queue backoff engine 311. Thus, each queue backoff engine 311 is associated with a respective traffic queue for using queue contention parameters including a respective computed queue backoff value, to be used to contend access to at least one communication channel in order to transmit data stored in the respective traffic queue over an accessed communication channel.

It results that the ACs within the same communication node compete one with each other to access the wireless medium and to obtain a transmission opportunity, using the conventional EDCA or channel contention scheme as explained above for example.

Service differentiation between the ACs is achieved by setting different queue backoff parameters between the ACs, such as different contention window parameters ($CW_{min}$, $CW_{max}$), different arbitration interframe spaces (AIFS), and different transmission opportunity duration limits (TXOP_Limit).

With EDCA, high priority traffic has a higher chance of being sent than low priority traffic: a node with high priority traffic waits a little less (low CW) before it sends its packet, on average, than a node with low priority traffic.

The four AC buffers (210) are shown in FIG. 2a.

Buffers AC3 and AC2 are usually reserved for real-time applications (e.g., voice or video transmission). They have, respectively, the highest priority and the last-but-one highest priority.

Buffers AC1 and AC0 are reserved for best effort and background traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 2b shows an example of mapping between eight priorities of traffic class (User Priorities or UP, 0-7 according IEEE 802.1d) and the four ACs. The data frame is then stored in the buffer corresponding to the mapped AC.

When the backoff procedure for a traffic queue (or an AC) ends, the MAC controller (reference 604 in FIG. 6 below) of the transmitting node transmits a data frame from this traffic queue to the physical layer for transmission onto the wireless communication network.

Since the ACs operate concurrently in accessing the wireless medium, it may happen that two ACs of the same communication node have their backoff ending simultaneously. In such a situation, a virtual collision handler (212) of the MAC controller operates a selection of the AC having the highest priority (as shown in FIG. 2b) between the conflicting ACs, and gives up transmission of data frames from the ACs having lower priorities.

Then, the virtual collision handler commands those ACs having lower priorities to start again a backoff operation using an increased CW value.

The QoS resulting from the use of the ACs may be signalled in the MAC data frames, for instance in a QoS control field included in the header of the IEEE 802.11e MAC frame.

Figure 3:
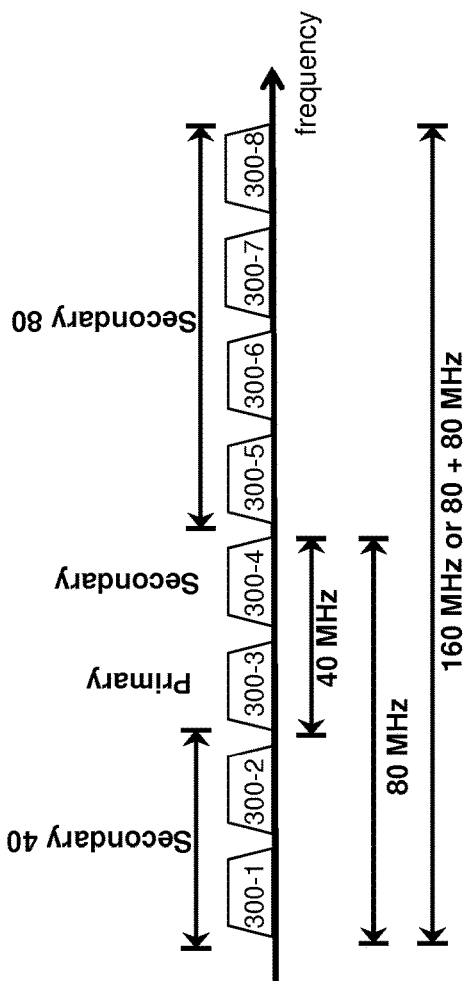
FIG. 3 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 3 illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TXOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered with the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions. In the uplink, multi-user transmissions can be used to mitigate the collision probability by allowing multiple nodes to simultaneously transmit.

To actually perform such multi-user transmission, it has been proposed to split a granted 20 MHz channel (300-1 to 300-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 4.

The multi-user feature of OFDMA allows the AP to assign different RUs to different nodes in order to increase competition. This may help to reduce contention and collisions inside 802.11 networks.

Contrary to MU downlink OFDMA wherein the AP can directly send multiple data to multiple nodes (supported by specific indications inside the PLCP header), a trigger mechanism has been adopted for the AP to trigger MU uplink communications from various nodes.

To support a MU uplink transmission (during a pre-empted TxOP), the 802.11ax AP has to provide signalling information for both legacy nodes (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 4:
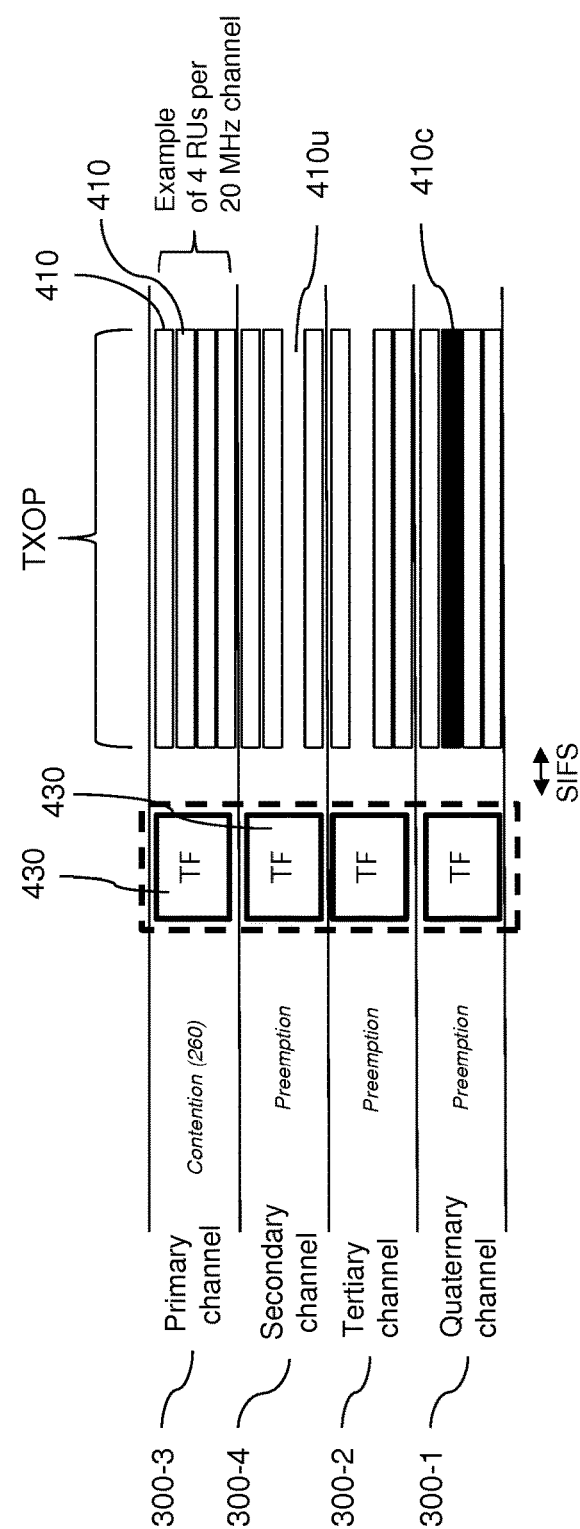
FIG. 4 illustrates an example of 802.11ax uplink OFDMA transmission scheme, wherein the AP issues a Trigger Frame for reserving a transmission opportunity of OFDMA subchannels (resource units) on an 80 MHz channel as known in the art.

As shown in the example of FIG. 4, the AP sends a trigger frame (TF) 430 to the targeted 802.11ax nodes. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 410, or "Random RUs", which can be randomly accessed by the nodes of the network. In other words, Random RUs designated or allocated by the AP in the TF may serve as basis for contention between nodes willing to access the communication medium for sending data. A collision occurs when two or more nodes attempt to transmit at the same time over the same RU.

In that case, the trigger frame is referred to as a trigger frame for random access (TF-R). A TF-R may be emitted by the AP to allow multiple nodes to perform UL MU (UpLink Multi-User) random access to obtain an RU for their UL transmissions.

The trigger frame TF may also designate Scheduled resource units, in addition or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

In the example of FIG. 4, each 20 MHz channel (400-1, 400-2, 400-3 or 400-4) is sub-divided in frequency domain into four sub-channels or RUs 410, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment (not show in the Figure) to acknowledge the data on each RU.

Document IEEE 802.11-15/1105 provides an exemplary random allocation procedure that may be used by the nodes to access the Random RUs indicated in the TF. This random allocation procedure, referred to as RU contention scheme, is managed by a dedicated RU access module separate from the above-mentioned channel access module and configured to manage access to at least one resource unit provided by another node (usually the AP) within a transmission opportunity granted to the other node on the communication channel, in order to transmit data stored locally over an accessed resource unit. Preferably, the RU access module includes an RU backoff engine separate from the queue backoff engines, which uses RU contention parameters, including a computed RU backoff value, to contend for access to the random RUs.

In other words, the RU contention scheme is based on a new backoff counter, referred below to as the OFDMA or RU backoff counter/value (or OBO), inside the 802.11ax nodes for allowing a dedicated contention when accessing a random RU to send data.

Each node STA1 to STAn is a transmitting node with regards to receiving AP, and as a consequence, each node has an active RU backoff engine separate from the queue backoff engines, for computing an RU backoff value (OBO) to be used to contend for access to at least one random resource unit splitting a transmission opportunity granted on the communication channel, in order to transmit data stored in either traffic queue AC.

The random allocation procedure comprises, for a node of a plurality of nodes having an active RU backoff value OBO, a first step of determining from the trigger frame the random sub-channels or RUs of the communication medium available for contention, a second step of verifying if the value of the active RU backoff value OBO local to the considered node is not greater than a number of detected-as-available random RUs, and then, in case of successful verification, a third step of randomly selecting a random RU among the detected-as-available random RUs for sending data. In case of second step is not verified, a fourth step (instead of the third) is performed in order to decrement the RU backoff value OBO by the number of detected-as-available RUs.

As shown in the Figure, some Resource Units may not be used (410*u*) because no node with an RU backoff value OBO less than the number of available random RUs has randomly selected one of these random RUs, whereas some other are collided (as example 410*c*) because two of these nodes have randomly selected the same RU.

The MU Uplink medium access scheme proves to be very efficient compared to conventional EDCA access scheme. This is because the number of collisions generated by simultaneous medium access attempts and the overhead due to the medium access are both reduced.

However, the EDCA access scheme and MU Uplink OFDMA/RU access scheme have to coexist, in particular to allow legacy 802.11 nodes to access the medium and to allow even the 802.11ax nodes to initiate communication with nodes other than the AP.

Although the EDCA access scheme taken alone provides a fair access to the medium throughout all the nodes, its association with the MU Uplink OFDMA/RU access scheme introduces a drift in fairness. This is because, compared to the legacy nodes, the 802.11ax nodes have additional opportunities to send data through the resource units offered in the transmission opportunity granted to another node, in particular to the AP.

This drift should be reduced as much as possible.

It is a broad objective of the present invention to provide improved and fairer communication methods and devices in a communication network.

To achieve that the present invention proposes to update the channel (or EDCA) contention parameters, in particular the EDCA backoff counters, using penalty values upon the node taking advantage of an additional opportunity to send data over a resource unit. The penalty value applied to the channel contention parameters may thus reduce the probability for the node to access anew a communication channel through conventional (EDCA) contention.

The penalty value is preferably provided by the AP which has an overview of the system and may be adjusted based on information local to a given node (for instance the amount of data transmitted, or the current contention window).

For instance, the penalty value is added to the current value of the EDCA backoff counters upon successful OFDMA transmission by the node. Thus, the probability to access anew the communication channel is adjusted, usually reduced, each time the node successfully accesses a resource unit and transmits data over it.

The present invention thus takes place when the node transmits data stored locally over an accessed resource unit provided (to the node) by another node (e.g. the AP) within a transmission opportunity granted to the other node on the communication channel. According to the invention, the node modifies, in response to transmitting the data over the accessed resource unit, a current value of at least one channel contention parameter into a penalized value, to reduce a probability for the node to access a communication channel through contention.

Another aspect of embodiments of the present invention takes place at the AP side to efficiently drive the nodes in modifying their current value of at least one channel contention parameter into a penalized value based on the sent penalty value upon each node transmitting data over an accessed resource unit. This is again to reduce a probability for these nodes to access the communication channel through contention, because they used an additional opportunity to send data offered by the resource units splitting a transmission opportunity granted to the AP.

In use, the AP receives data from one or more nodes over any one of communication channels accessed by the one or more nodes, and resource units accessed by the one or more nodes, each resource unit being provided by the access point within a transmission opportunity granted to the access point on the communication channel.

The AP may thus build statistics on the history of the received data, and then determine a penalty value from a history of the received data.

To drive the nodes as mentioned above, the AP sends the determined penalty value to the nodes.

Figure 5:
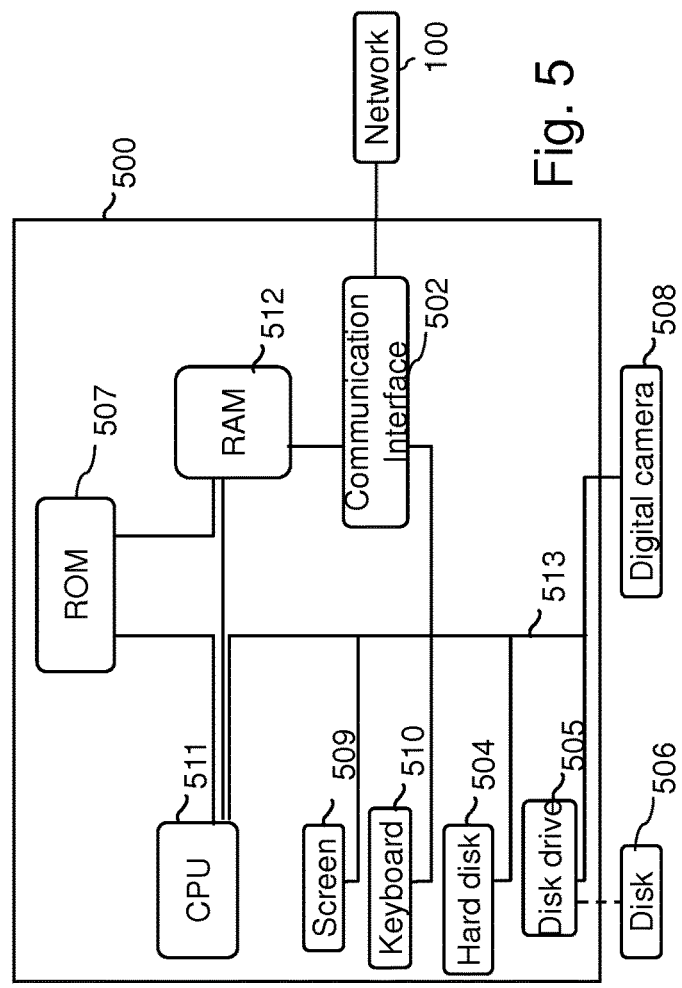
FIG. 5 shows a schematic representation a communication device or station in accordance with embodiments of the present invention.

FIG. 5 schematically illustrates a communication device 500 of the radio network 100, configured to implement at least one embodiment of the present invention. The communication device 500 may preferably be a device such as a micro-computer, a workstation or a light portable device. The communication device 500 comprises a communication bus 513 to which there are preferably connected:

a central processing unit 511, such as a microprocessor, denoted CPU;

a read only memory 507, denoted ROM, for storing computer programs for implementing the invention;

a random access memory 512, denoted RAM, for storing the executable code of methods according to embodiments of the invention as well as the registers adapted to record variables and parameters necessary for implementing methods according to embodiments of the invention; and at least one communication interface 502 connected to the radio communication network 100 over which digital data packets or frames or control frames are transmitted, for example a wireless communication network according to the 802.11ax protocol. The frames are written from a FIFO sending memory in RAM 512 to the network interface for transmission or are read from the network interface for reception and writing into a FIFO receiving memory in RAM 512 under the control of a software application running in the CPU 511.

Optionally, the communication device 500 may also include the following components:

a data storage means 504 such as a hard disk, for storing computer programs for implementing methods according to one or more embodiments of the invention;

a disk drive 505 for a disk 506, the disk drive being adapted to read data from the disk 506 or to write data onto said disk;

a screen 509 for displaying decoded data and/or serving as a graphical interface with the user, by means of a keyboard 510 or any other pointing means.

The communication device 500 may be optionally connected to various peripherals, such as for example a digital camera 508, each being connected to an input/output card (not shown) so as to supply data to the communication device 500.

Preferably the communication bus provides communication and interoperability between the various elements included in the communication device 500 or connected to it. The representation of the bus is not limiting and in particular the central processing unit is operable to communicate instructions to any element of the communication device 500 directly or by means of another element of the communication device 500.

The disk 506 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 507, on the hard disk 504 or on a removable digital medium such as for example a disk 506 as described previously. According to an optional variant, the executable code of the programs can be received by means of the communication network 503, via the interface 502, in order to be stored in one of the storage means of the communication device 500, such as the hard disk 504, before being executed.

The central processing unit 511 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 504 or in the read only memory 507, are transferred into the random access memory 512, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 6:
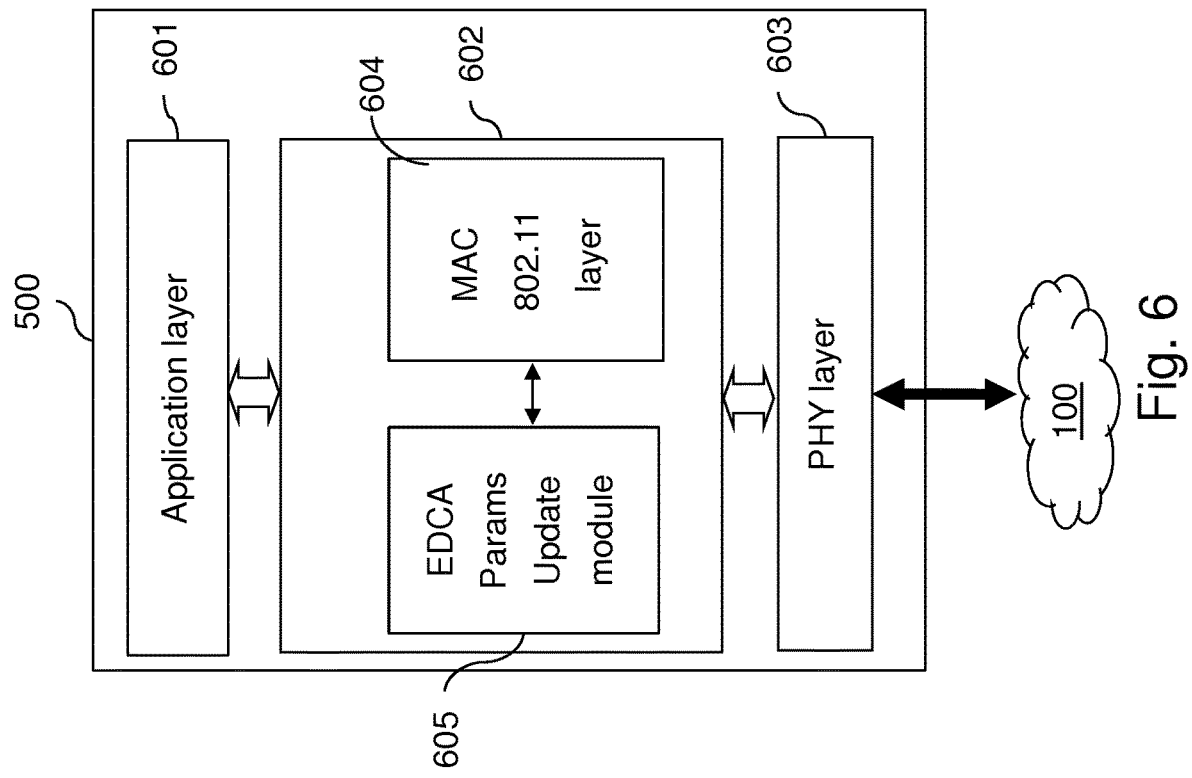
FIG. 6 shows a schematic representation of a wireless communication device in accordance with embodiments of the present invention.

FIG. 6 is a block diagram schematically illustrating the architecture of a communication device or node 500, in particular one of nodes 100-107, adapted to carry out, at least partially, the invention. As illustrated, node 500 comprises a physical (PHY) layer block 603, a MAC layer block 602, and an application layer block 601.

The PHY layer block 603 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 430 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 602 preferably comprises a MAC 802.11 layer 604 implementing conventional 802.11ax MAC operations, and an additional block 605 for carrying out, at least partially, the invention. The MAC layer block 602 may optionally be implemented in software, which software is loaded into RAM 512 and executed by CPU 511.

Preferably, the additional block, referred to as EDCA parameters update module 605 implements the part of the invention that regards node 500, i.e. modification of the one or more channel/EDCA contention parameters into penalized values, upon transmitting data over accessed resource units in case of a transmitting node, or computation of a penalty value to be transmitted to the nodes in case of the access point.

MAC 802.11 layer 604 and EDCA parameters update module 605 interact one with the other in order to provide management of the channel access module handling the queue backoff engines and a RU access module handling the RU backoff engine as described below.

On top of the Figure, application layer block 601 runs an application that generates and receives data packets, for example data packets of a video stream. Application layer block 601 represents all the stack layers above MAC layer according to ISO standardization.

Embodiments of the present invention are now illustrated using various exemplary embodiments. Although the proposed examples use the trigger frame 430 (see FIG. 4) sent by an AP for a multi-user uplink transmissions, equivalent mechanisms can be used in a centralized or in an ad-hoc environment (i.e. without an AP). It means that the operations described below with reference to the AP may be performed by any node in an ad-hoc environment.

These embodiments are mainly described in the context of IEEE 80211.ax by considering OFDMA resource units. Application of the invention is however not limited to the IEEE 802.11ax context.

Also the present invention does not necessarily rely on the usage of a MU access scheme as described in 802.11ax. Any other RU access scheme defining alternate medium access schemes allowing simultaneous access by the nodes to same medium can also be used.

Figure 7:
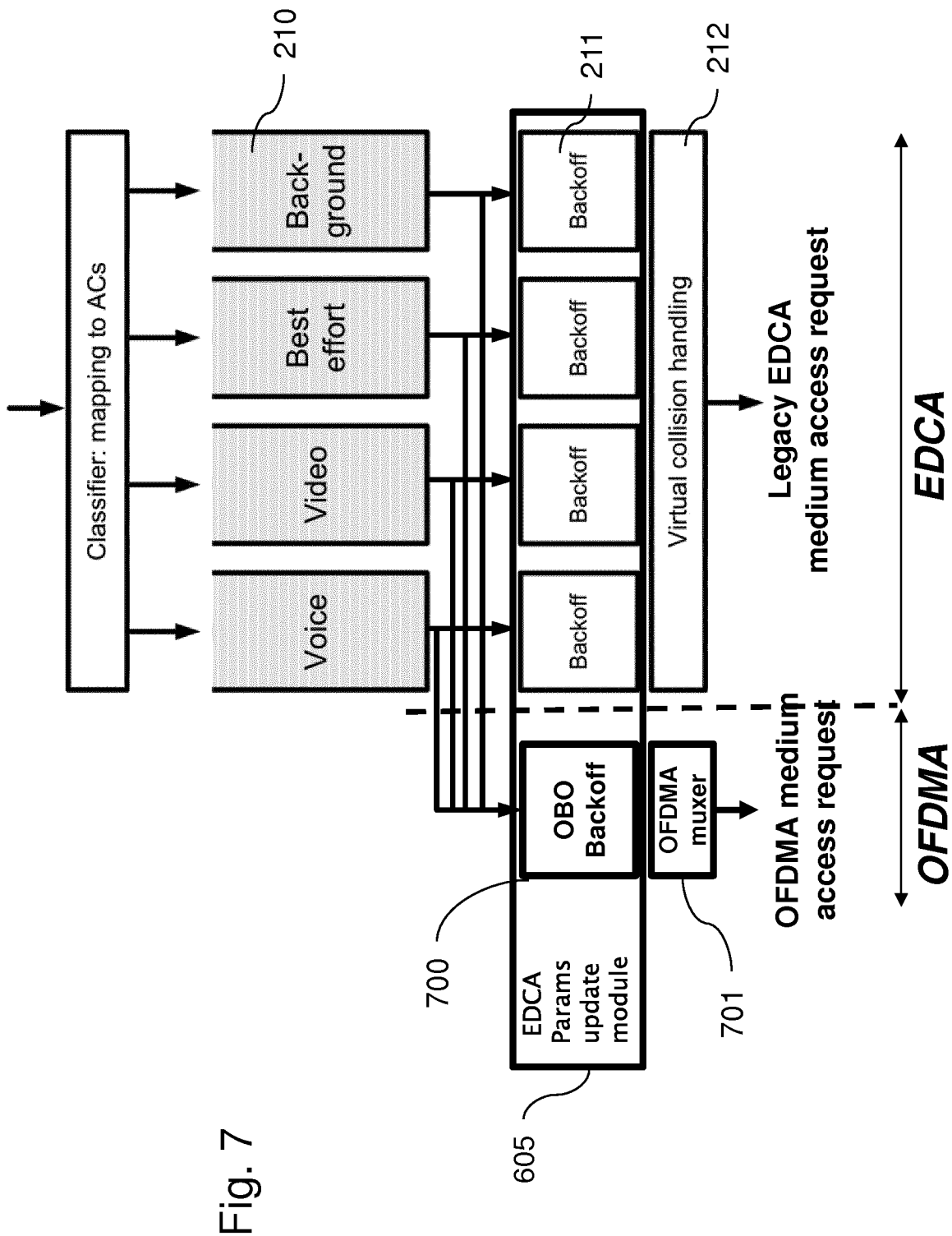
FIG. 7 illustrates an exemplary transmission block of a communication node according to embodiments of the invention.

FIG. 7 illustrates an exemplary transmission block of a communication node 500 according to embodiments of the invention.

As mentioned above, the node includes a channel access module and possibly an RU access module, both implemented in the MAC layer block 602. The channel access module includes:

a plurality of traffic queues 210 for serving data traffic at different priorities;

a plurality of queue backoff engines 211, each associated with a respective traffic queue for using queue contention parameters, in particular for computing a respective queue backoff value, to be used to contend for access to at least one communication channel in order to transmit data stored in the respective traffic queue. This is the EDCA access scheme.

The RU access module includes an RU backoff engine 700 separate from the queue backoff engines, for using RU contention parameters, in particular for computing an RU backoff value, to be used to contend for access to the OFDMA resource units defined in a received TF (sent by the AP for instance), in order to transmit data stored in either traffic queue in an OFDMA RU. The RU backoff engine 700 is associated with a transmission module, referred to as OFDMA muxer 701. For example OFDMA muxer 701 is in charge, when the RU backoff value OBO described below reaches zero, of selecting data to be sent from the AC queue 210.

The conventional AC queue back-off registers 211 drive the medium access request along EDCA protocol (channel contention scheme), while in parallel, the RU backoff engine 700 drives the medium access request onto OFDMA multi-user protocol (RU contention scheme).

As these two contention schemes coexist, the source node implements a medium access mechanism with collision avoidance based on a computation of backoff values:

a queue backoff counter value corresponding to a number of time-slots the node waits, after the communication medium has been detected to be idle, before accessing the medium. This is EDCA;

an RU backoff counter value (OBO) corresponding to a number of idle random RUs the node detects, after a TXOP has been granted to the AP or any other node over a composite channel formed of RUs, before accessing the medium. This is OFDMA. A variant to counting down the OBO based on the number of idle random RUs may be based on a time-based countdown.

In embodiments of the invention, EDCA params update module 605 is in charge, for each node, of modifying a current value of at least one channel contention parameter (backoff 211 or contention window of the AC queues 210) of the channel/EDCA access module into a penalized value, in order to reduce a probability for the node to access a communication channel through contention by the channel access module.

Upon transmission, preferably successful transmission, of data by the node using the MU UL transmission scheme (i.e. through resource unit or units), EDCA params update module 605 apply a penalty value to one or several of the EDCA contention parameters.

This is to promote the usage of the MU UL mechanism while restoring fairness regarding medium access opportunities, between the legacy nodes and the 802.11ax nodes, as the latter benefits from additional access opportunities through access to resource units.

Generally speaking, the penalty value may be predefined or obtained from the AP or even computed locally. For instance the AP may send, in a TF or a beacon frame, the penalty value to be directly applied or to be used in a local computation to obtain a final penalty value to be applied to a current contention parameter value. Several penalty values may also be transmitted or computed corresponding to each of the traffic types shown in FIG. 2*b*. A local computation of a final penalty value may involve the amount of data transmitted by the node to trigger the update of the contention parameter. This is to avoid a node to be strongly penalized when it only sends a reduced quantity of data via the OFDMA scheme. It may also involve the current value of a contention window, local to the node considered.

Finally, the penalty value may be applied, e.g. added, to one or more current EDCA backoff values, and/or applied, e.g. as a multiplying factor, to a local contention window. Of course the penalty values used may be different when applied to EDCA backoff values and when applied to a local contention window.

Figure 8:
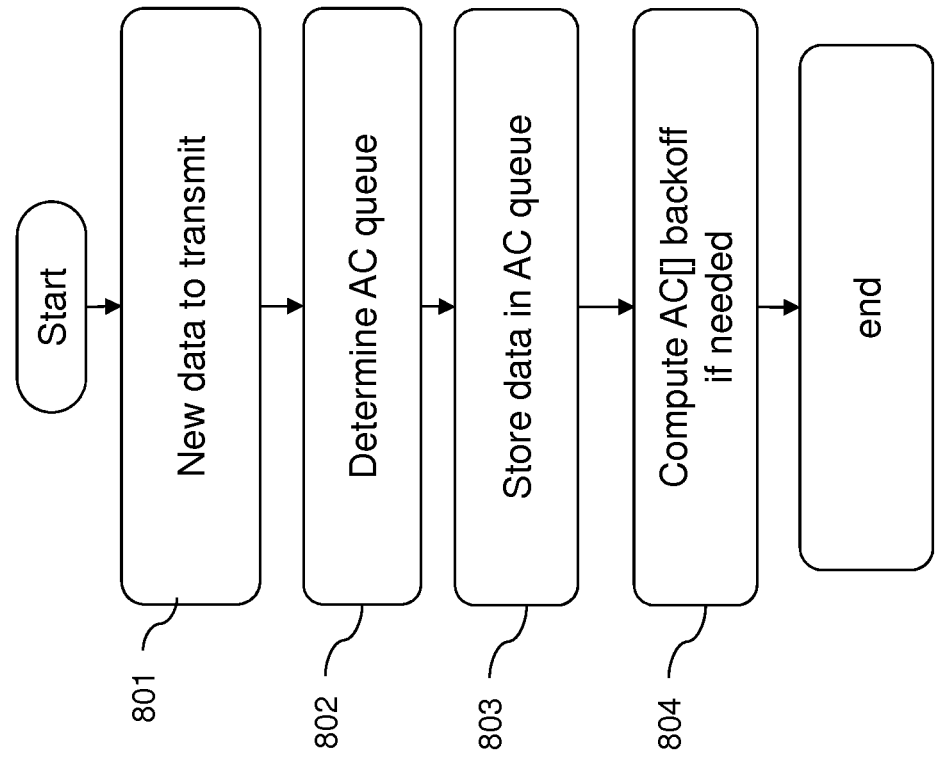
FIG. 8 illustrates, using a flowchart, main steps performed by a MAC layer of a node, when receiving new data to transmit, in embodiments of the invention.

FIG. 8 illustrates, using a flowchart, main steps performed by MAC layer 602 of node 500, when receiving new data to transmit. It illustrates a conventional FIFO feeding in 802.11 context.

At the very beginning, none traffic queue 210 stores data to transmit. As a consequence, no queue backoff value 211 has been computed. It is said that the corresponding queue backoff engine or corresponding AC (Access Category) is inactive. As soon as data are stored in a traffic queue, a queue backoff value is computed (from corresponding queue backoff parameters), and the associated queue backoff engine or AC is said to be active.

When a node has data ready to be transmitted on the medium, the data are stored in one of the AC queue 210, and the associated backoff 211 should be updated.

At step 801, new data are received from an application local running on the device (from application layer 601 for instance), from another network interface, or from any other data source. The new data are ready to be sent by the node.

At step 802, the node determines in which AC queues 210 the data should be stored. This operation is usually performed by checking the TID (Traffic Identifier) value attached to the data (according to the matching shown in FIG. 2*b*).

Next, step 803 stores the data in the determined AC queue. It means the data are stored in the AC queue having the same data type as the data.

At step 804, conventional 802.11 AC backoff computation is performed by the queue backoff engine associated with the determined AC queue.

If the determined AC queue was empty just before the storage of step 803 (i.e. the AC is originally inactive), then there is a need to compute a new queue backoff value for the corresponding backoff counter.

The node then computes the queue backoff value as being equal to a random value selected in range [0, CW]+AIFS, where CW is the current value of the CW for the Access Category considered (as defined in 802.11 standard and updated for instance according to some embodiments of the invention as described in step 1080 below), and AIFS is an offset value which depends on the AC of the data (all the AIFS values being defined in the 802.11 standard) and which is designed to implement the relative priority of the different access categories. CW is a congestion window value that is selected from selection range [$CW_{min}$, $CW_{max}$], where both boundaries $CW_{min}$ and $CW_{max}$ depends on the Access Category considered.

As a result the AC is made active.

The above parameters CW, $CW_{min}$, $CW_{max}$, AIFS, and Backoff value form the channel or queue contention parameters associated with each AC. They are used to set the relative priority to access the medium for the different categories of data.

Some of those parameters have usually a fixed value (e.g. $CW_{min}$, $CW_{max}$, and AIFS), while the two other parameters (CW and backoff value) evolves over time and medium availability.

Also step 804 may include computing the RU backoff value OBO if needed. An RU backoff value OBO needs to be computed if the RU backoff engine 700 was inactive (for instance because there were no data in the traffic queues until previous step 803) and if new data to be addressed to the AP have been received.

The RU backoff value OBO may be computed in a similar fashion as the EDCA backoff value, i.e. using dedicated RU contention parameters, such as a dedicated contention window [0, CWO] and a selection range [$CWO_{min}$, $CWO_{max}$].

Note that some embodiments may provide distinction between data that can be sent through resource units (i.e. compatible with OFDMA transmission) and those that cannot. Such decision can be made during step 802, and a corresponding marking item can be added to the stored data.

In such a case, the RU backoff value OBO is computed only if the newly stored data are marked as compatible with OFDMA transmission.

Next to step 804, the process of FIG. 8 ends.

Once data are stored in the AC queues, the node may access the medium either directly through EDCA access scheme as illustrated below with reference to FIG. 9, or through resource units provided by the AP through one or more trigger frames, as illustrated below with reference to FIG. 10.

Figure 9:
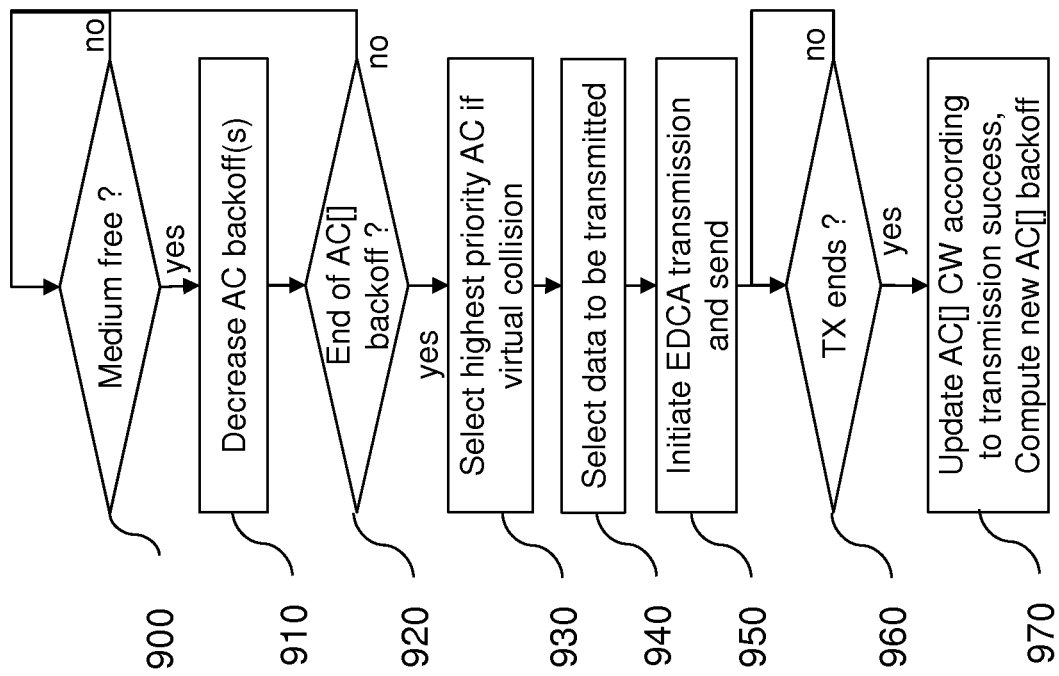
FIG. 9 illustrates, using a flowchart, steps of accessing the medium based on the conventional EDCA medium access scheme, in embodiments of the invention.

FIG. 9 illustrates, using a flowchart, steps of accessing the medium based on the conventional EDCA medium access scheme.

Steps 900 to 920 describe a conventional waiting introduced in the EDCA mechanism to reduce the collision on a shared wireless medium. In step 900, node 500 senses the medium waiting for it to become available (i.e. detected energy is below a given threshold on the primary channel).

When the medium becomes free during a backoff timeslot or "DIFS period", step 910 is executed in which node 500 decrements all the active (non-zero) AC[ ] queue backoff counters 211 by one. In other words, the node decrements the queue backoff values each elementary time unit DIFS the communication channel is detected as idle.

Next, at step 920, node 600 determines if at least one of the AC backoff counters reaches zero.

If no AC queue backoff reaches zero, node 500 waits for another backoff timeslot (typically 9 μs), and thus loops back to step 900 in order to sense the medium again during the next backoff timeslot.

If at least one AC queue backoff reaches zero, step 930 is executed in which node 500 (more precisely virtual collision handler 212) selects the active AC queue having a zero queue backoff counter and having the highest priority.

At step 940, an appropriate amount of data is selected from this selected AC for transmission.

Next, at step 950, node 500 initiates an EDCA transmission, in case for instance an RTS/CTS exchange has been successfully performed to have a TXOP granted. Node 500 thus sends the selected data on the medium, during the granted TXOP.

Next, at step 960, node 500 determines whether or not the EDCA transmission has ended, in which case step 970 is executed.

At step 970, node 500 updates the contention window CW of the selected traffic queue, based on the status of transmission (positive or negative ack, or no ack received). Typically, node 500 doubles the value of CW if the transmission failed, until CW reaches a maximum value $CW_{max}$ defined by the 802.11 standard and which depends on the AC type of the data. On the other hand, if the EDCA transmission is successful, the contention window CW is set to a minimum value $CW_{min}$ also defined by the 802.11 standard and which is also dependent on the AC type of the data.

Next, if the selected traffic queue is not empty after the EDCA data transmission, a new associated queue backoff counter is randomly selected from [0,CW], similar to step 804.

This ends the process of FIG. 9.

According to embodiments of the invention, a current value of at least one channel contention parameter, including for instance such queue backoff counter values, and/or the AC contention windows, and/or even $CW_{min}$ and/or $CW_{max}$, can be modified into a penalized value. This is to reduce a probability for the node to access a communication channel through EDCA contention, in order to restore fairness which may have been drifted due to additional medium access opportunities provided to some nodes by OFDMA access to RUs.

Thus a non-zero current value can be modified into a degraded, and thus non-zero also, penalized value.

Such modification takes place when the node transmits data stored locally over an accessed resource unit forming part of a transmission opportunity granted to another node, usually the AP, on the communication channel. In other words, during an OFDMA access to RUs as now described with reference to FIG. 10.

FIG. 10 illustrates, using a flowchart, steps of accessing resource units based on an RU or OFDMA access scheme upon receiving a trigger frame defining RUs.

At step 1010, the node determines whether a trigger frame is received from the access point in the communication network, the trigger frame reserving a transmission opportunity granted to the access point on the communication channel and defining resource units, RUs, forming the communication channel. If so, the node analyses the content of the received trigger frame.

At step 1020, the node determines whether or not it can transmit data over one of the RUs defined in the received trigger frame. The determination may involve one or both of two conditions, regarding in particular the type of RUs.

By analysing the content of the received TF, the node determines whether or not a defined RU is a scheduled resource unit assigned by the access point to the node. This may be done by looking for its own AID in the received TF, which AID will be associated with a specific scheduled RU to be used for transmission.

Also, by analysing the content of the received TF, the node determines whether or not one or more random RUs are defined in the TF, i.e. RUs the access of which being made through contention using dedicated RU contention parameters (including the above-mentioned OBO value 700). In that case, the node also determines whether or not its current OBO value 700 allows one random RU to be selected (in particular if OBO 700 is less than the number of random RUs in the TF).

If one scheduled RU is assigned to the node or the latter is allowed to access one random RU, the node determines the size of the random/scheduled RU or RUs to be used and step 1030 is executed. Otherwise, the node decrements the RU backoff value OBO 700 based on the number of random resource units defined in the received trigger frame, and the process ends as the node cannot access any RU defined by the received TF.

At step 1030, the node selects at least one of the traffic queues 210 from which the data to be transmitted are selected, and adds data of the selected queue or queues to the transmission buffer until the quantity of data reaches the size of the selected resource unit to be used.

Various criteria to select a current traffic queue may be involved.

For instance, this may be done by:

selecting a traffic queue 210 having the lowest associated queue backoff value. The selection of the traffic queue thus depends on the value of the EDCA backoff 211;

selecting randomly one non-empty traffic queue from the traffic queues;

selecting a traffic queue storing the biggest amount of data (i.e. the most loaded);

selecting a non-empty traffic queue having the highest associated traffic priority (given the AC categories shown in FIG. 2b);

selecting a non-empty traffic queue associated with a data type matching a data type associated with the resource unit (the data type may be defined in a dedicated field of the TF when the AP defines the RUs) over which the data to select are to be transmitted.

Next at step 1040, the node stores an item of information representing the amount of data thus selected from the current traffic queue, for transmission in the RU. For instance, then node updates a list of emitting queues by inserting the quantity of data selected from the current traffic queue.

This list of emitting queue can be implemented through a table containing for each traffic queue, the quantity of data put in the transmission buffer.

This item of information may be used to adjust the way some contention parameters are modified according to the teachings of the invention. Embodiments relying on such item of information are described below.

At step 1050, the node determines whether or not the amount of data stored in the transmission buffer is enough to fill the selected resource unit.

If not, there is still room for additional data in the resource unit. Thus the process loops back to step 1030 during which another traffic queue is selected, using the same selection criteria. In such a way, the transmission buffer is progressively filled up to reaching the selected resource unit size.

In a variant which avoids mixing data from two or more traffic queues (i.e. the data for the selected RU are selected from a single traffic queue), padding data may be added to entirely fill the selected RU. This is to ensure the whole RU duration has energy that can be detected by legacy nodes.

Once, the transmission buffer is full for the selected RU, step 1060 initiates the OFMDA transmission of the data stored in the transmission buffer, to the AP. The OFDMA transmission is based on the OFDMA sub-channel and modulation defined in the received trigger frame and especially in the RU definition.

Next, once the transmission has been performed, and preferably upon successful transmission (i.e. an acknowledgment is received from the AP), step 1070 determines the penalty value or values to be applied to one or more EDCA parameters of the traffic queue or queues, in order to modify it or them into penalized value or values.

Several embodiments can be contemplated to determine the value or values of the penalty at step 1070.

In first embodiments, the received trigger frame (at step 1010) includes one or more penalty values to be applied by the node to one or more current value to obtain the penalized value of one or more queue contention parameters (e.g. AC backoff value). Thus, the penalty value is retrieved from the TF.

Exemplary embodiments of computing such penalty value or values by the AP and of adding it or them to the TF are described below with reference to FIGS. 11a and 11b.

In a variant of the first embodiments, a received beacon frame includes one or more (by-default) penalty values to be applied by the node to one or more current values to obtain the penalized value of one or more queue contention parameters (e.g. AC backoff value).

Indeed, the 802.11 standard defines a beacon frame as a frame broadcasting the 802.11 network information to all nodes of the communication network. The beacon frame is periodically transmitted, approximately each 100 milliseconds, during which a plurality of network accesses are made by the nodes or the AP. Thus, the node considered periodically receives such a beacon frame from the access point, each beacon frame broadcasting network information about the communication network to the plurality of nodes.

As several trigger frames may be sent by the AP between two consecutive beacon frames, embodiments may provide using the penalty value retrieved from a first beacon frame as a by-default penalty value, and updating this by-default penalty value (through replacement or through modification) based on a penalty value retrieved from each successive trigger frame before the next beacon frame. In such a way, the AP may adjust over time the penalty value to be applied. In other words, the node uses the penalty value included in the trigger frame to modify the penalty value included in the beacon frame, in order to obtain a final penalty value to be applied to the current value to obtain the penalized value of the queue contention parameter.

In second embodiments, the penalty value is a fixed value defined by the standard and not transmitted from the AP. It is thus retrieved by the node from a local memory.

In third embodiments, the value of the penalty to be applied to the EDCA/channel contention parameters may be determined based on the amount of data transmitted at step 1060. This information can be retrieved from the list updated at step 1040. The amount of data may be expressed as a multiple of a reference quantity of data, typically 256 bytes.

In the third embodiments, the node multiplies this amount of data by a penalty factor. This approach will make it possible for the node to modify the current value of a channel contention parameter into a penalized value depending on the amount of data transmitted in the resource unit accessed at step 1060.

The first embodiments described above may be used to retrieve the penalty factor: it may be retrieved from the TF, from a beacon frame (and possibly updated), or may be a fixed value.

Taking into account the amount of data actually transmitted advantageously makes it possible to avoid strongly penalizing a node that only sends a reduced quantity of data via the OFDMA scheme.

In fourth embodiments, the penalty value to be applied to the EDCA/channel parameters depends on the priority of the traffic queues, i.e. depends on the data type considered (see FIG. 2b).

In this case, the node thus retrieves a set of penalty values, each value being associated to a specific AC queue or data type. Of course, each of these penalty values may be computed according to any of the above first, second and third embodiments.

In particular, the received beacon frame or the received trigger frame may include a plurality of penalty values associated with respective data types. In that case, the node selects a penalty value from the plurality based on a data type associated with a traffic queue corresponding to a channel contention parameter to modify.

Once the penalty value or values have been retrieved, step 1080 is executed in order to actually modify the EDCA/channel contention parameter or parameters. As mentioned above, this is to reduce the probability of EDCA transmission for the node.

As widely known, EDCA transmission probability is mainly controlled by two parameters: first the size of the congestion window CW of each AC queues 210, and second the current value of the AC/queue backoffs 211 being decreased by the node over time to access the communication channel upon reaching zero. EDCA parameters also include boundaries $CW_{min}$, $CW_{max}$, and the arbitration interframe space AIFS.

Thus, the step 1080 of modifying one or more EDCA parameters by applying a penalty value may operate on one or several of those elements.

In embodiments, the modified channel contention parameter includes a queue backoff value, for instance all queue backoff values 211.

In other embodiments, the modified channel contention parameter includes a size of a contention window CW from which a queue backoff value 211 is initially selected.

Since the penalty value can be dynamically computed upon each MU UL transmission, it is worth modifying not only the congestion window size or sizes of the AC queues, but also the current queue backoff value or values 211.

Regarding the modification of a queue backoff value 211, the node may add the retrieved penalty value (thus used as an offset) to such a queue backoff value, preferably to each queue backoff value 211 (unless one specific penalty value is used per each data type or AC priority as explained above with reference to the fourth embodiments of step 1070).

In a variant that seeks to similarly impact the various EDCA queues, the penalty value used as an offset value may be adjusted based on the corresponding congestion window size (to be done for each traffic queue if appropriate). In other words, the penalty value added to the queue backoff value is a function of a size of a contention window from which the queue backoff value has initially been selected. Indeed, the higher the contention window size, the higher the queue backoff value on overall. Thus, to be fair, the impact on the traffic queues is preferably made proportional to the contention window.

For instance, the added penalty value (used as an offset) may be calculated as the product of a previously retrieved penalty value (step 1070) with a ratio between the contention window size CW and the lower boundary $CW_{min}$ of the selection range from which CW is selected. As a result, the penalty also takes into account an estimate of the network load, to be made fair and efficient.

Regarding the modification of a contention window size CW (either all CWs or one specific CW of an AC queue), it may be done by multiplying CW by the penalty factor determined at step 1070.

Similar modification may be provided to the lower boundary $CW_{min}$ and/or higher boundary $CW_{max}$, both defining the selection range from which CW is selected.

One may note that the OFDMA access may empty one or more traffic queues 210. To ensure consistency between the EDCA backoff values 211 and the content of their associated traffic queue 210 given this situation, it is also provided at step 1080 that the node may clear (i.e. deactivate) a queue backoff value corresponding to a traffic queue when no more data to be transmitted to the access point remain in the traffic queue after the step of transmitting data.

By providing (penalizing) adjustments of the EDCA/channel contention parameters, the present invention restores fairness between legacy nodes and 802.11ax nodes, given the additional opportunities for the latter to access the medium through RUs offered by the AP.

As mentioned above, the AP may provide one or more penalty values to the nodes. They may be added to the sent TFs or beacon frames.

For illustrative purposes, the computation and provision of such penalty values by the AP is now described with reference to FIG. 11a.

As mentioned above, the AP determines a penalty value (or values) from a history of data received from the nodes (through EDCA or OFDMA transmission); and sends, to the nodes, the determined penalty value (or values) to drive the nodes in modifying their current values of one or more EDCA/channel contention parameters into penalized values based on the sent penalty value (or values) upon the nodes transmitting data over an accessed resource unit. Again, this is to reduce a probability for the nodes to access the communication channel through contention, thereby restoring fairness with respect to the legacy nodes.

FIG. 11a illustrates, using a flowchart, general steps for the AP to compute and send one or more penalty values. Of course, in case the AP does not send such penalty values, the AP performs conventional processing.

Step 1100 is continuously performed by the AP upon receiving data from the nodes over either communication channels accessed by the one or more nodes, or resource units accessed by the one or more nodes, or both, each resource unit forming part of a transmission opportunity granted to the access point on the communication channel. Thus step 1100 is made upon receiving each new data packet from the nodes.

At step 1100, the AP updates local statistics on the usage of the two medium access schemes, EDCA access scheme and OFDMA/RU access scheme.

Thus, each time the AP receives a new packet via one or the other of the two medium access schemes, it updates internal statistics about the amount of data received through each of both schemes.

The history may be based on a moving time window in order to efficiently mirror the current situation of the communication network, regardless old events. For instance the moving time window is defined as a multiple of beacon frame periodicity (e.g. five beacon frame periodicities representing a window of about 500 ms). The moving time window may for instance starts from a beacon frame. In a variant, it may be a sliding time window.

In variants, the history may also be made from the last transmission of a penalty value as described below. It particularly applies when such transmission is made conditional to criteria.

Still at step 1100, the relative ratio of usage of the two medium accesses, i.e. a ratio of bandwidth usage of resource units accessed (through OFDMA) by the nodes to transmit data to the access point, relatively to a total bandwidth usage of (EDCA and OFDMA) communication channels and resource units accessed by the nodes to transmit data to the access point may be evaluated to also update internal statistics. This ratio gives an estimate of the efficiency of the penalty.

The AP may optionally update internal statistics about the efficiency of the two medium access schemes, for instance by counting the number of collisions occurring on each medium access for the considered basic set. Such additional statistics give an indication on how useful the penalty process is with regards to the current use of the network. They may thus be used to decide whether or not to transmit the penalty value, as described below with reference to optional step 1115.

As the statistics on history evolve over time, the AP computes from time to time a new penalty value to be sent to the nodes. This is step 1110. The latter may be periodically triggered, for instance upon receiving each data packet from the node, or, more efficiently, when preparing each new beacon frame and/or each new trigger frame.

In embodiments, a current penalty value local to the AP is updated based on a current estimate of the above-mentioned ratio of bandwidth usage. The initial penalty value when starting the AP or when resetting the history/statistics may be set to 0 (no penalty)

The penalty value may be defined within a penalty range from a minimum value (0 in the above example) to a maximum value which may correspond to forbidding EDCA access scheme. In embodiments, the penalty value may take discrete values within the penalty range. For example, by defining the penalty range in percentages, from 0% to 100%, the penalty range may take the tens: 0%, 10%, 20% and so on. Using discrete values provides stability to the system.

For instance, the current penalty value is increased each time an evaluation of said ratio is less than a predefined target threshold (for instance 20%—defined by the cell administrator for instance, or set by the standard). Such increasing is performed until the usage ratio of MU UL OFDMA medium access schemes reaches the target threshold. It thus promotes usage of MU UL OFDMA medium accesses for the 802.11ax nodes.

On the other hand, the current penalty value is decreased each time an evaluation of said ratio is higher than a predefined target threshold. This is to reversely reduce promotion of MU Uplink through RUs, in order to reduce risk of having collisions therein.

In addition, deciding to send or not such computed penalty value may be based on the statistics about the efficiency of the two medium access schemes. For instance, deciding to send the current penalty value may depend on a ratio between a number of accessed resource units that experience collisions, and a total number of resource units accessed by the nodes to transmit data to the access point.

As an example, promotion of MU UL OFDMA medium accesses may be reinforced (by sending the penalty value or any new penalty value) when the ratio of collided resource units remain low (lower than a predefined threshold). On the other hand, promotion of MU UL OFDMA medium accesses should be reduced (by not sending the penalty value or any new penalty value) when the ratio of collided resource units is too high.

In variants, the penalty value can be a fixed value provided by the standard (thus stored locally at the AP) and computed to optimize a ratio of usage of the MU UL medium access scheme. The AP may thus only retrieves this value from local memory.

Thus, next to step 1110, the AP optionally determines at step 1115 whether or not the collision-based ratio is low or high. If high, the penalty value computed at step 1110 is not sent (not shown in the Figure).

Otherwise, the AP sends the penalty value to the nodes.

In embodiments, the penalty value is sent in the next trigger frame reserving a transmission opportunity to the access point on the communication channel and defining resource units, RUs, forming the communication channel. Thus step 1120 is executed where the current value of the penalty is inserted in the next trigger frame that will be sent to the nodes. This may be done by inserting the penalty value in the Trigger dependant info field 1180 of the trigger frame as shown in FIG. 11*b*.

Figure 11B:
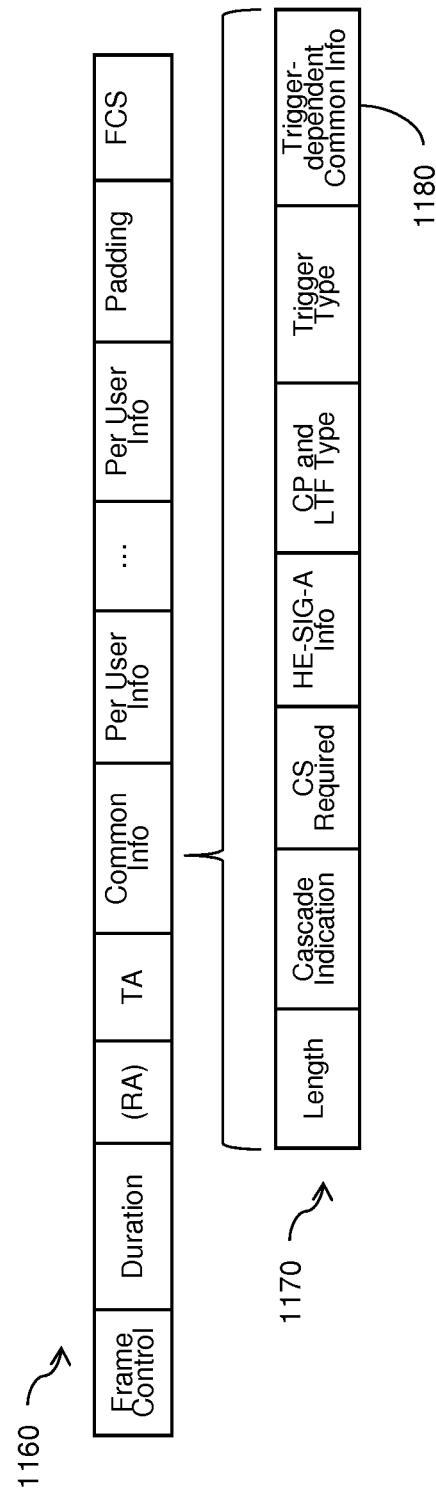
FIG. 11b illustrates the structure of a trigger frame as defined in the 802.11ax standard.

FIG. 11*b* illustrates the structure of a trigger frame as defined in the 802.11ax draft standard.

The trigger frame 1160 is composed of a dedicated field 1170 called Common Info Field. This field contains a "Trigger dependent Common info" field 1180 in which the Penalty values can be inserted.

The other fields of the trigger frame are defined in the 802.11ax standard.

Once the penalty value has been inserted in the trigger frame, the latter can be sent to the nodes at step 1130.

These embodiments are advantageously used when the penalty value is computed dynamically by the AP.

In other embodiments, the penalty value is sent in the next beacon frame broadcasting network information about the communication network to the plurality of nodes. Thus, step 1140 is executed where the penalty value is inserted in the next beacon frame. This may be done by inserting the PP in a dedicated Information element.

Next, step 1150 is executed, and the beacon frame containing the penalty value is sent to all the nodes.

These other embodiments are advantageously used when the penalty value is a fixed value retrieved from local memory by the AP.

With reference to the fourth embodiments of step 1070 above, a set of penalty values corresponding to respective data types (or AC priorities) should be computed and transmitted by the AP. It means the access point determines (as in step 1110) a penalty value for each type of data, from a history of received data having the same data type; and the AP sends, to the nodes, a plurality of penalty values associated with respective data types.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a communication network comprising a plurality of nodes, a node accessing to a communication channel of the communication network using enhanced distributed channel access, EDCA, contention based on EDCA parameters, in order to transmit data; and the method comprising, at the node:
receiving from an access point a plurality of values associated with respective access categories, ACs;
transmitting data over a multi-user, MU, orthogonal frequency-division multiple access, OFDMA, resource unit reserved by a trigger frame conforming to IEEE802.11 series of standards provided by another node within a transmission opportunity granted to the other node on the communication channel; and
in response to successfully transmitting data over the MU OFDMA resource unit,
selecting a value from the received plurality of values based on an AC associated with the successfully transmitted data, and
updating, based on the selected value, a current value of one or more EDCA parameters into an updated value that forbids the node from accessing the communication channel using EDCA contention.

2. The method of claim 1, further comprising, at the node, periodically receiving a beacon frame from the access point, each beacon frame broadcasting network information about the communication network to the plurality of nodes,
wherein a received beacon frame includes the selected value updating the current value into the updated value.

3. The method of claim 2, wherein the received beacon frame or a received trigger frame includes the plurality of values associated with respective ACs.

4. The method of claim 1, wherein updating the current value of the EDCA parameter into the updated value depends on the amount of data transmitted in the accessed MU OFDMA resource unit.

5. The method of claim 1, wherein the updated EDCA parameter value includes a queue backoff value, the queue backoff value being decreased by the node over time to access the communication channel upon reaching zero.

6. The method of claim 5, wherein updating the queue backoff value includes adding a penalty value to the queue backoff value.

7. The method of claim 6, wherein the added penalty value is a function of a size of a contention window from which the queue backoff value has initially been selected.

8. The method of claim 1, wherein the updated EDCA parameter value includes a size of a contention window from which a queue backoff value is initially selected, the queue backoff value being decreased by the node over time to access the communication channel upon reaching zero, and/or a lower boundary $CW_{min}$ and/or a higher boundary $CW_{max}$, both defining a selection range from which a size of the contention window is selected, and updating the contention window size or the lower boundary or the higher boundary includes multiplying it with a penalty value.

9. The method of claim 1, wherein the accessed MU OFDMA resource unit over which the data are transmitted is a random MU OFDMA resource unit, the access of which being made through contention using separate RU EDCA parameters.

10. The method of claim 1, further comprising, at the node, clearing a queue backoff value corresponding to a traffic queue when no more data to be transmitted to the access point remain in the traffic queue after the step of transmitting data, the queue backoff value associated with a non-empty traffic queue being decreased by the node over time to access the communication channel upon reaching zero.

11. The method of claim 1, wherein the updated value forbids the one or more nodes from accessing a communication channel through EDCA contention during a predefined period.

12. A communication method in a communication network comprising an access point and a plurality of nodes registered to the access point, wherein at least one of the plurality of nodes contends for access to a communication channel of the communication network using enhanced distributed channel access, EDCA, contention based on EDCA parameters, in order to transmit data; and
the method comprising, at the access point:
receiving data from one or more nodes over multi-user, MU, orthogonal frequency-division multiple access, OFDMA, resource units each conforming to IEEE802.11 series of standards accessed by the one or more nodes, each MU OFDMA resource unit being reserved by a trigger frame and provided by the access point within a transmission opportunity granted to the access point on the communication channel;
retrieving, from local memory, a plurality of values associated with respective access categories, ACs; and
sending, to the one or more nodes, the retrieved plurality of values associated with the respective ACs to drive the one or more nodes in, upon successfully transmitting data over an accessed resource unit, updating a current value of one or more EDCA parameters into an updated value based on value selected from the plurality based on an AC associated with the successfully transmitted data, to forbid the one or more nodes from accessing the communication channel using EDCA contention.

13. The method of claim 12, wherein retrieving the plurality of values includes updating a current value based on a ratio of bandwidth usage of MU OFDMA resource units accessed by the one or more nodes to transmit data to the access point, relatively to a total bandwidth usage of communication channels and MU OFDMA resource units accessed by the one or more nodes to transmit data to the access point.

14. The method of claim 13, wherein the current value is increased each time an evaluation of the ratio is less than a predefined target threshold.

15. The method of claim 14, wherein the current value is decreased each time an evaluation of the ratio is higher than a predefined target threshold.

16. The method of claim 12, wherein sending the plurality of values to the one or more nodes depends on a ratio between a number of accessed MU OFDMA resource units that experience collisions, and a total number of MU OFDMA resource units accessed by the one or more nodes to transmit data to the access point.

17. The method of claim 12, wherein the access point determines a value for each AC, from a history of received data of the same AC.

18. A communication device forming node in a communication network comprising a plurality of nodes, the communication device forming a node, said node accessing to a communication channel of the communication network using enhanced distributed channel access, EDCA, contention based on EDCA parameters, in order to transmit data, the communication device comprising:
a communication module configured to receive from an access point a plurality of penalty values associated with respective access categories, ACs, and configured to transmit data over a multi-user, MU, orthogonal frequency-division multiple access, OFDMA, resource unit reserved by a trigger frame conforming to IEEE802.11 series of standards provided by another node within a transmission opportunity granted to the other node on the communication channel, and
a controller configured to, in response to successfully transmitting data over the MU OFDMA resource unit by the data transmission module,
select a value from the received plurality of values based on an AC associated with the successfully transmitted data, and
update, based on the selected penalty value, a current value of one or more EDCA parameters into an updated value that forbids the node from accessing the communication channel using EDCA contention.

19. A communication device forming access point in a communication network comprising an access point and a plurality of nodes, wherein at least one of the plurality of nodes contends for access to a communication channel of the communication network using enhanced distributed channel access, EDCA, contention based on EDCA parameters, in order to transmit data; and
the communication device forming access point comprising:
a communication module configured to receive data from one or more nodes over multi-user, MU, orthogonal frequency-division multiple access, OFDMA, resource units each conforming to IEEE802.11 series of standards accessed by the one or more nodes, each MU OFDMA resource unit being reserved by a trigger frame and provided by the access point within a transmission opportunity granted to the access point on the communication channel;
a determining module configured to retrieve, from local memory, a plurality of values associated with respective access categories, ACs;
wherein the communication module is further configured to send, to the one or more nodes, the retrieved plurality of values associated with the respective ACs to drive the one or more nodes in, upon successfully transmitting data over an accessed resource unit, updating a current value of one or more EDCA parameters into an updated value based on a value selected from the plurality based on an AC associated with the successfully transmitted data, to forbid the one or more nodes from accessing the communication channel using EDCA contention.

\* \* \* \* \*